United States Patent
Oshio

(10) Patent No.: US 10,101,158 B2
(45) Date of Patent: Oct. 16, 2018

(54) CIRCUIT FOR PHYSICAL QUANTITY SENSOR, PHYSICAL QUANTITY SENSOR, AND METHOD FOR MANUFACTURING PHYSICAL QUANTITY SENSOR

(71) Applicant: Seiko Epson Corporation, Tokyo (JP)

(72) Inventor: Masahiro Oshio, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 267 days.

(21) Appl. No.: 15/130,332

(22) Filed: Apr. 15, 2016

(65) Prior Publication Data

US 2016/0313124 A1 Oct. 27, 2016

(30) Foreign Application Priority Data

Apr. 24, 2015 (JP) ................ 2015-089076

(51) Int. Cl.
*G01C 19/5776* (2012.01)
*G01C 19/5649* (2012.01)
*G01C 19/5726* (2012.01)

(52) U.S. Cl.
CPC ..... *G01C 19/5726* (2013.01); *G01C 19/5649* (2013.01); *G01C 19/5776* (2013.01)

(58) Field of Classification Search
CPC ................................ G01C 19/5726
See application file for complete search history.

(56) References Cited

U.S. PATENT DOCUMENTS

| 7,808,151 | B2 | 10/2010 | Komine |
| 2009/0013785 | A1* | 1/2009 | Yoshida ................ G01C 19/56 73/514.16 |
| 2011/0115498 | A1* | 5/2011 | Kumar ................ B81C 99/0045 324/649 |
| 2014/0290363 | A1 | 10/2014 | Shindo et al. |
| 2016/0290828 | A1 | 10/2016 | Oshio et al. |

FOREIGN PATENT DOCUMENTS

| JP | 2008-107324 A | 5/2008 |
| JP | 2014-190941 A | 10/2014 |
| JP | 2016-194467 A | 11/2016 |

* cited by examiner

*Primary Examiner* — Manish S Shah
*Assistant Examiner* — Herbert K Roberts
(74) *Attorney, Agent, or Firm* — Oliff PLC

(57) ABSTRACT

A circuit for an angular velocity sensor as a circuit for a physical quantity sensor according to an embodiment of the invention includes a drive circuit that generates a drive signal that drives a driver to vibrate and a switch circuit that switches a state in which a detector that outputs a detection signal in accordance with a physical quantity is electrically continuous with the drive circuit or a state in which the detector is not electrically continuous with the drive circuit to the other state.

10 Claims, 12 Drawing Sheets

CIRCUIT FOR PHYSICAL QUANTITY SENSOR, PHYSICAL QUANTITY SENSOR, AND METHOD FOR MANUFACTURING PHYSICAL QUANTITY SENSOR

BACKGROUND

1. Technical Field

The present invention relates to a circuit for a physical quantity sensor, a physical quantity sensor, and a method for manufacturing the physical quantity sensor.

2. Related Art

There has been a known vibration gyroscope in which a piezoelectric device, such as a quartz vibrator, serves as a gyroscope device.

The vibration gyroscope described in JP-A-2008-107324 includes a piezoelectric device that serves as a gyroscope device, an oscillation circuit that feeds a drive signal back to a drive end of the piezoelectric device to drive and excite the piezoelectric device in such a way that it vibrates, and a drive signal switch circuit that controls output of the drive signal from the oscillation circuit to an external destination, and the drive signal switch circuit outputs drive current or drive voltage of the drive signal from the oscillation circuit as a signal that allows calculation of the series resistance value of the equivalent constant of the piezoelectric device. The series resistance value of the driver of the piezoelectric device is thus measured for a test of the drive level of the piezoelectric device without use of any externally connected measurement apparatus.

The configuration of the vibration gyroscope described in JP-A-2008-107324, however, when the vibration device has a driver and a detector separate from each other, is undesirably not allowed to test the detector.

SUMMARY

An advantage of some aspects of the invention is to solve at least a part of the problems described above, and the invention can be implemented as the following aspects or application examples:

Application Example 1

A circuit for a physical quantity sensor according to this application example includes a drive circuit that drives a driver to vibrate and a switch circuit that switches a state in which a detector that outputs a detection signal in accordance with a physical quantity is electrically continuous with the drive circuit or a state in which the detector is not electrically continuous with the drive circuit to the other state.

According to this application example, since the switch circuit can switch the state in which the detector is electrically continuous with the drive circuit or the state in which the detector is not electrically continuous with the drive circuit to the other state, a signal from the drive circuit can be applied also to the detector. The circuit for a physical quantity sensor provided by the present application example therefore also allows the detector to be tested with the signal from the drive circuit.

Application Example 2

In the circuit for a physical quantity sensor according to the application example described above, it is preferable that in the state in which the detector is electrically continuous with the drive circuit, the driver is not electrically continuous with the drive circuit, and that in the state in which the detector is not electrically continuous with the drive circuit, the driver is electrically continuous with the drive circuit.

According to this application example, since the switch circuit can switch the state in which the detector is electrically continuous with the drive circuit or the state in which the driver is electrically continuous with the drive circuit to the other state, a signal from the drive circuit can be applied to each of the detector and the driver. Therefore, the circuit for a physical quantity sensor provided by the present application example, which has a simple configuration, allows both the driver and the detector to be tested.

Application Example 3

In the circuit for a physical quantity sensor according to the application example described above, it is preferable that the drive circuit includes a current/voltage conversion circuit that converts an inputted current signal into a voltage signal, a comparison determination circuit that outputs a signal based on comparison between the voltage signal and reference voltage, and a drive signal generation circuit that outputs a signal having a voltage level based on the output from the comparison determination circuit, and that the reference voltage is selected from a plurality of voltage values.

According to this application example, the drive voltage can be controlled on the basis of the reference voltage, and the reference voltage can be changed. Therefore, in normal operation in which a physical quantity is detected, excitation current can be so controlled as to be constant on the basis of the reference voltage, whereas in other cases, the drive circuit can output a test drive signal different from the drive signal in the normal operation by changing the reference voltage. Therefore, the circuit for a physical quantity sensor provided by the present application example, which has a simple configuration, can detect a physical quantity and test the driver and the detector.

Application Example 4

A physical quantity sensor according to this application example includes a driver that is driven in accordance with a drive signal to vibrate, a detector that outputs a detection signal in accordance with a physical quantity, a drive circuit that generates the drive signal, and a switch circuit that switches a state in which the detector is electrically continuous with the drive circuit or a state in which the detector is not electrically continuous with the drive circuit to the other state.

According to this application example, since the switch circuit can switch the state in which the detector is electrically continuous with the drive circuit or the state in which the detector is not electrically continuous with the drive circuit to the other state, the signal from the drive circuit can be applied also to the detector. The physical quantity sensor provided by the present application example therefore also allows the detector to be tested with the signal from the drive circuit.

Application Example 5

In the physical quantity sensor according to the application example described above, it is preferable that in the state in which the detector is electrically continuous with the drive circuit, the driver is not electrically continuous with the drive circuit, and that in the state in which the detector is not electrically continuous with the drive circuit, the driver is electrically continuous with the drive circuit.

According to this application example, since the switch circuit can switch the state in which the detector is electrically continuous with the drive circuit or the state in which the driver is electrically continuous with the drive circuit to the other state, the signal from the drive circuit can be applied to each of the detector and the driver. Therefore, the physical quantity sensor provided by the present application example, which has a simple configuration, allows both the driver and the detector to be tested.

Application Example 6

In the physical quantity sensor according to the application example described above, it is preferable that the drive circuit includes a current/voltage conversion circuit that converts an inputted current signal into a voltage signal, a comparison determination circuit that outputs a signal based on comparison between the voltage signal and reference voltage, and a drive signal generation circuit that outputs a signal having a voltage level based on the output from the comparison determination circuit, and that the reference voltage is selected from a plurality of voltage values.

According to this application example, the drive voltage can be controlled on the basis of the reference voltage, and the reference voltage can be changed. Therefore, in normal operation in which a physical quantity is detected, excitation current can be so controlled as to be constant on the basis of the reference voltage, whereas in other cases, the drive circuit can output a test drive signal different from the drive signal in the normal operation by changing the reference voltage. Therefore, the physical quantity sensor provided by the present application example, which has a simple configuration, can detect a physical quantity and test the driver and the detector.

Application Example 7

A method for manufacturing a physical quantity sensor according to this application example includes generating a test drive signal by using a drive circuit that drives a driver to vibrate and switching a state in which a detector that outputs a detection signal in accordance with a physical quantity is electrically continuous with the drive circuit or a state in which the detector is not electrically continuous with the drive circuit to the other state by using a switch circuit for a test of the detector.

According to this application example, since the switch circuit can switch the state in which the detector is electrically continuous with the drive circuit or the state in which the detector is not electrically continuous with the drive circuit to the other state, the signal from the drive circuit can be applied also to the detector. The method for manufacturing a physical quantity sensor provided by the present application example therefore allows the detector to be tested with the signal from the drive circuit and possibility of the physical quantity sensor being defective to be lowered.

Application Example 8

In the method for manufacturing a physical quantity sensor according to the application example described above, it is preferable that in the state in which the detector is electrically continuous with the drive circuit, the driver is caused not to be electrically continuous with the drive circuit, and that in the state in which the detector is not electrically continuous with the drive circuit, the driver is caused to be electrically continuous with the drive circuit.

According to this application example, since the switch circuit can switch the state in which the detector is electrically continuous with the drive circuit or the state in which the driver is electrically continuous with the drive circuit to the other state, the signal from the drive circuit can be applied to each of the detector and the driver. Therefore, the method for manufacturing a physical quantity sensor provided by the present application example, which has a simple configuration, allows both the driver and the detector to be tested.

Application Example 9

In the method for manufacturing a physical quantity sensor according to the application example described above, it is preferable that the drive circuit includes a current/voltage conversion circuit that converts an inputted current signal into a voltage signal, a comparison determination circuit that outputs a signal based on comparison between the voltage signal and reference voltage, and a drive signal generation circuit that outputs the test drive signal having a voltage level based on the output from the comparison determination circuit, that the reference voltage is selected from a plurality of voltage values, and that the voltage level of the test drive signal is higher than a voltage level of a signal generated by the drive circuit when the physical quantity is detected.

According to this application example, in normal operation in which a physical quantity is detected, the level of excitation current is so controlled as to be constant on the basis of the reference voltage, whereas at the time of the test, a test drive signal having a voltage level higher than the voltage level of a drive signal in the normal operation can be generated. An overdrive test can therefore be conducted by application of the test drive signal to the driver and the detector. The method for manufacturing a physical quantity sensor provided by the present application example therefore allows rejection of a defective physical quantity sensor with high precision.

Application Example 10

In the method for manufacturing a physical quantity sensor according to the application example described above, it is preferable that the drive circuit includes a current/voltage conversion circuit that converts an inputted current signal into a voltage signal, a comparison determination circuit that outputs a signal based on comparison between the voltage signal and reference voltage, and a drive signal generation circuit that outputs the test drive signal having a voltage level based on the output from the comparison determination circuit, that the reference voltage is selected from a plurality of voltage values, and that at least one of the detector and the driver is tested on the basis of the voltage level of the output from the current/voltage conversion circuit measured with respect to the plurality of reference voltages and the voltage level of the output from the drive signal generation circuit measured with respect to the plurality of reference voltages.

According to this application example, when a physical quantity is detected, the level of excitation current can be so controlled as to be constant on the basis of the reference voltage, whereas at the time of the test, test drive signals having a plurality of voltage levels can be applied for good/no good determination on the basis of a change in any electrical characteristic of the driver and the detector in response to a change in the drive level. The method for manufacturing a physical quantity sensor provided by the present application example therefore allows the test to be efficiently conducted in a short period.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. In the following drawings, each layer and each member are so drawn at scales different from actual scales as to be large enough to be recognizable.

First Embodiment

Schematic Configuration of Physical Quantity Sensor

Figure 1:
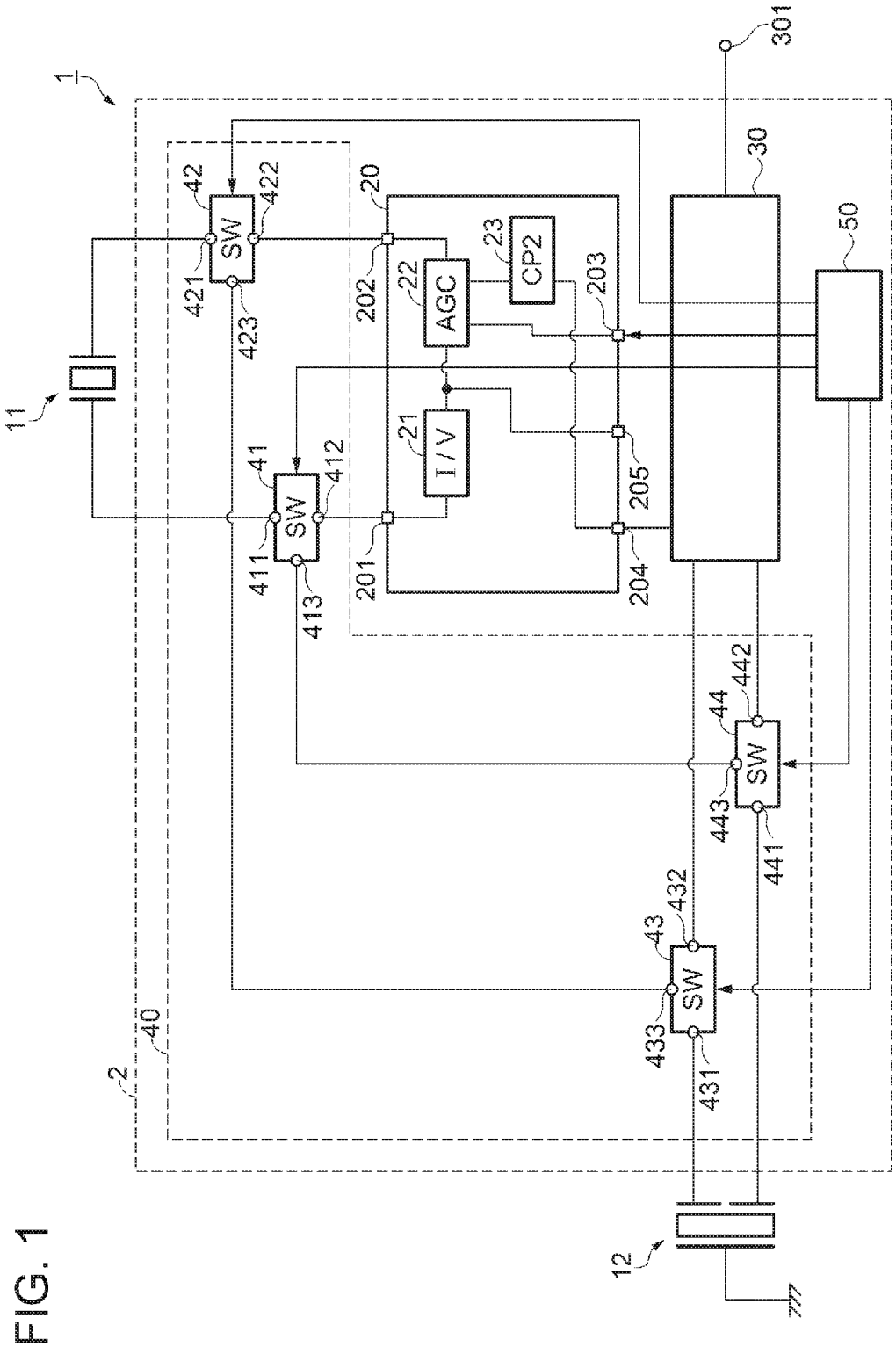
FIG. 1 is a schematic view of a physical quantity sensor according to a first embodiment.

FIG. 1 is a schematic view of a physical quantity sensor according to a first embodiment.

A description will first be made of a schematic configuration of an angular velocity sensor 1 as the physical quantity sensor according to the first embodiment. The angular velocity sensor 1 is a sensor that outputs, when it is rotated, an angular velocity signal according to given angular velocity.

The angular velocity sensor 1 is formed, for example, of an angular velocity detection device 10 (see FIG. 5) formed, for example, of a driver 11 and a detector 12 and a circuit for an angular velocity sensor 2 as a circuit for a physical quantity sensor. The circuit for an angular velocity sensor 2 is formed, for example, of a drive circuit 20, a detection circuit 30, a switch circuit 40, and a control circuit 50.

The angular velocity sensor 1, in normal operation for detection of angular velocity, drives the driver 11 to vibrate in accordance with a drive signal generated by the drive circuit 20. The detection circuit 30 then processes a detection signal generated in accordance with given angular velocity by the detector 12 and outputs an angular velocity signal.

In a test of the angular velocity sensor 1, a test drive signal generated by the drive circuit 20 causes the driver 11 and the detector 12 to vibrate. The driver 11 and the detector 12 are thus tested. In this process, the switch circuit 40 chooses whether the test drive signal is applied to the driver 11 or the detector 12.

Configuration of Each Circuit Section

The drive circuit 20 is formed, for example, of an excitation current input electrode 201, a drive voltage output electrode 202, a reference voltage input electrode 203, a wave detection clock output electrode 204, an IVO electrode 205, a current/voltage conversion circuit 21, an AGC circuit 22, and a second comparator 23.

In normal operation, the drive circuit 20 generates a drive signal and outputs the drive signal through the drive voltage output electrode 202 to drive and cause the driver 11 to vibrate. Excitation current flowing through the driver 11 is inputted through the excitation current input electrode 201 to the drive circuit 20, converted by the current/voltage conversion circuit 21 into a voltage signal, and inputted to the AGC circuit 22. The AGC circuit 22 adjusts the amplitude of the drive signal on the basis of the input from the current/voltage conversion circuit 21 and a reference voltage inputted through the reference voltage input electrode 203 in such a way that constant excitation current flows through the driver 11. An oscillation loop is thus formed by the driver 11 and the drive circuit 20. The second comparator 23 generates a wave detection clock signal from the drive signal and outputs the wave detection clock signal to the wave detection clock output electrode 204. The wave detection clock signal is used in synchronous wave detection process carried out in the detection circuit 30.

In normal operation, the detection circuit 30 causes the detection signal from the detector 12 to undergo a synchronous wave detection process based on the wave detection clock signal through the wave detection clock output electrode 204 and a detection signal process, such a filtering process using a low-pass filter. An angular velocity signal corresponding to the magnitude of angular velocity is thus outputted through a detection terminal 301.

The switch circuit 40 is formed, for example, of a first switch circuit 41, a second switch circuit 42, a third switch circuit 43, and a fourth switch circuit 44.

The first switch circuit 41 has a first-first terminal 411, a first-second terminal 412, and a first-third terminal 413. The second switch circuit 42 has a second-first terminal 421, a second-second terminal 422, and a second-third terminal 423. The third switch circuit 43 has a third-first terminal 431, a third-second terminal 432, and a third-third terminal 433. The fourth switch circuit 44 has a fourth-first terminal 441, a fourth-second terminal 442, and a fourth-third terminal 443.

The first-first terminal 411 of the first switch circuit 41 is electrically connected to one end of the driver 11. The first-second terminal 412 of the first switch circuit 41 is electrically connected to the excitation current input electrode 201 of the drive circuit 20. The first-third terminal 413 of the first switch circuit 41 is electrically connected to the fourth-third terminal 443 of the fourth switch circuit 44. The first switch circuit 41 is so provided as to switch the state thereof between a state in which the first-first terminal 411 is electrically continuous with the first-second terminal 412 and a state in which the first-second terminal 412 is electrically continuous with the first-third terminal 413.

The second-first terminal 421 of the second switch circuit 42 is electrically connected to the other end of the driver 11. The second-second terminal 422 of the second switch circuit 42 is electrically connected to the drive voltage output electrode 202 of the drive circuit 20. The second-third terminal 423 of the second switch circuit 42 is electrically connected to the third-third terminal 433 of the third switch circuit 43. The second switch circuit 42 is so provided as to switch the state thereof between a state in which the second-first terminal 421 is electrically continuous with the second-second terminal 422 and a state in which the second-second terminal 422 is electrically continuous with the second-third terminal 423.

The third-first terminal 431 of the third switch circuit 43 is electrically connected to one end of the detector 12. The third-second terminal 432 of the third switch circuit 43 is electrically connected to one end of an input section of the detection circuit 30. The third-third terminal 433 of the third switch circuit 43 is electrically connected to the second-third terminal 423 of the second switch circuit 42. The third switch circuit 43 is so provided as to switch the state thereof between a state in which the third-first terminal 431 is electrically continuous with the third-second terminal 432 and a state in which the third-first terminal 431 is electrically continuous with the third-third terminal 433.

The fourth-first terminal 441 of the fourth switch circuit 44 is electrically connected to the other end of the detector 12. The fourth-second terminal 442 of the fourth switch circuit 44 is electrically connected to the other end of the input section of the detection circuit 30. The fourth-third terminal 443 of the fourth switch circuit 44 is electrically connected to the first-third terminal 413 of the first switch circuit 41. The fourth switch circuit 44 is so provided as to switch the state thereof between a state in which the fourth-first terminal 441 is electrically continuous with the fourth-second terminal 442 and a state in which the fourth-first terminal 441 is electrically continuous with the fourth-third terminal 443.

The control circuit 50 inputs controls signals to the first switch circuit 41 to the fourth switch circuit 44 and controls the connection switching in each of the switch circuits. A state in which the detector 12 is electrically continuous with the drive circuit 20 but the driver 11 is not electrically continuous with the drive circuit 20 is thus switched to a state in which the detector 12 is not electrically continuous with the drive circuit 20 but the driver 11 is electrically continuous with the drive circuit 20 and vice versa. The control circuit 50 further selects the reference voltage from a plurality of voltage values and inputs the reference voltage to the reference voltage input electrode 203 of the drive circuit 20.

Detailed Configuration of Drive Circuit

Figure 2:
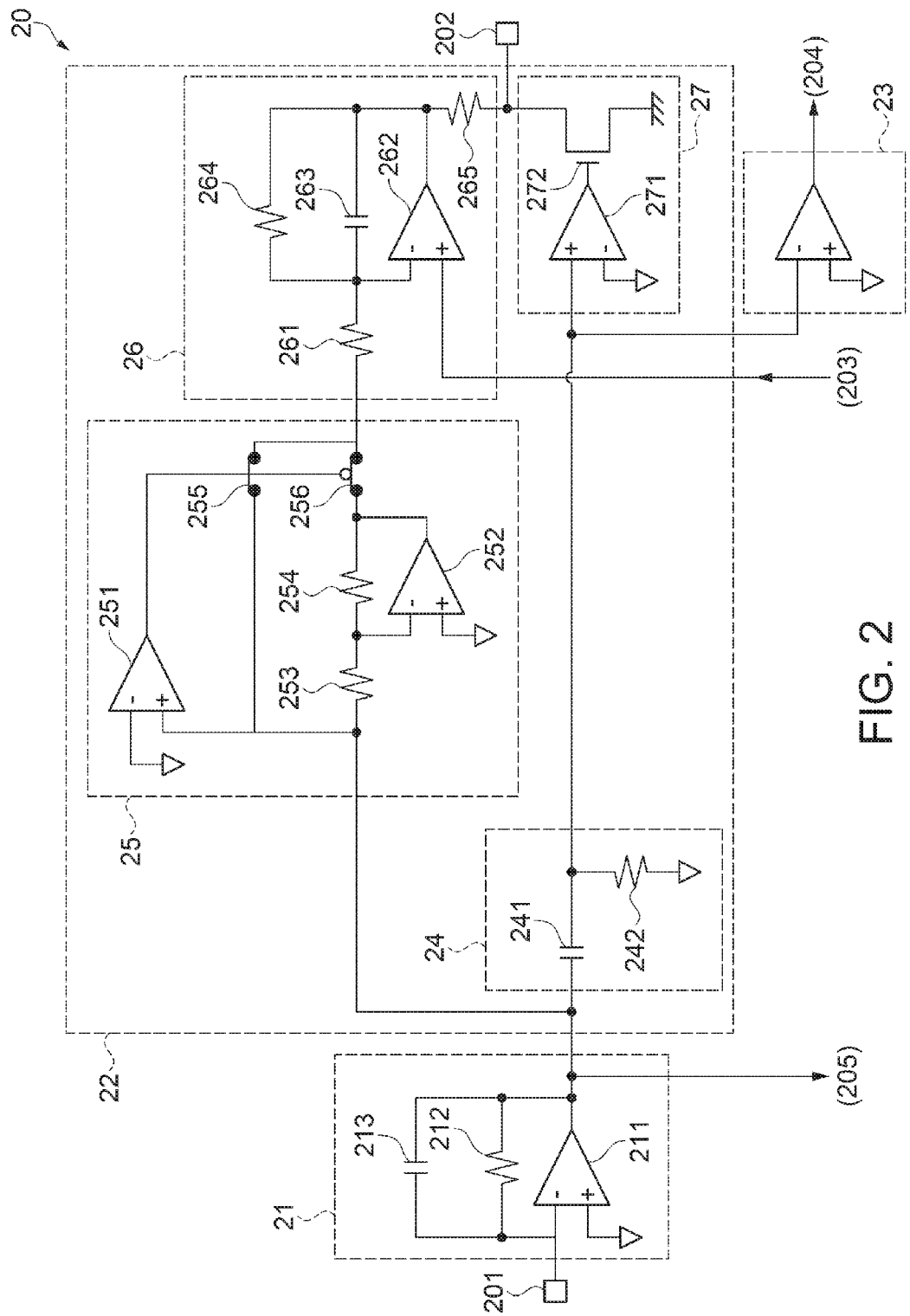
FIG. 2 is a circuit diagram of a drive circuit.

FIG. 2 is a circuit diagram showing a detailed configuration of the drive circuit 20.

The drive circuit 20 is formed, for example, of the current/voltage conversion circuit 21, the AGC circuit 22, and the second comparator 23, and the AGC circuit 22 is formed, for example, of a high-pass filter 24, a full wave rectifier circuit 25, a comparison determination circuit 26, and a drive signal generation circuit 27.

The current/voltage conversion circuit 21 is a circuit that converts an inputted current signal into a voltage signal and includes an operational amplifier 211, a resistor 212, and a capacitor 213 connected in parallel to one another. The current/voltage conversion circuit 21 outputs a voltage signal proportional to the excitation current inputted from the driver 11 or the detector 12 to the excitation current input electrode 201. An output node of the current/voltage conversion circuit 21 is electrically connected to the IVO electrode 205.

The high-pass filter 24 is a circuit that eliminates low-frequency signals and includes a capacitor 241 and a resistor 242 connected to each other. The high-pass filter 24 can remove an offset component contained in the output from the current/voltage conversion circuit 21 and adjust the phase of the signal.

The full wave rectifier circuit 25 is a circuit that causes an AC signal to undergo full wave rectification and includes a comparator 251, an operational amplifier 252, a resistor 253, a resistor 254, a switch 255, and switch 256. The comparator 251 compares the output from the current/voltage conversion circuit 21 with a reference, and when the output is greater than the reference, the switch 255 is turned on and the switch 256 is turned off so that the output is allowed to pass through as it is. On the other hand, when the output is smaller than the reference, the switch 255 is turned off and the switch 256 is turned on so that an inversion amplification circuit formed of the resistor 253, the resistor 254, and the operational amplifier 252 inverts the output. The thus configured full wave rectifier circuit 25 outputs a signal resulting from the full wave rectification of the output from the current/voltage conversion circuit 21.

The comparison determination circuit 26 is a circuit that compares the output from the full wave rectifier circuit 25 with reference voltage and includes a resistor 261, an operational amplifier 262, a capacitor 263, a resistor 264, and a resistor 265. The output from the full wave rectifier circuit 25 is inputted to one input of the operational amplifier 262, and a signal through the reference voltage input electrode 203 is inputted to the other input of the operational amplifier 262. The thus configured comparison determination circuit 26 outputs a signal resulting from integration of the difference between the voltage corresponding to the excitation current and the reference voltage.

The drive signal generation circuit 27 is a circuit that generates a rectangular-wave drive signal and includes a first comparator 271 and an N transistor 272. The first comparator 271 compares the output from the high-pass filter 24 with a reference and inputs a digitized signal to the gate of the N transistor 272. Further, the output from the comparison determination circuit 26 is inputted to the drain of the N transistor 272. The thus configured drive signal generation circuit 27 outputs a rectangular-wave drive signal according to the phase of the output signal from the high-pass filter 24, and the voltage level Vin of the rectangular-wave drive signal corresponds to the voltage of the output from the comparison determination circuit 26. Therefore, the voltage level Vin of the drive signal is adjusted in accordance with a change in the excitation current flowing through the driver 11 or the detector 12, and even when the equivalent resistance of the driver 11 or the detector 12 changes due, for example, to a change in surrounding temperature, the excitation current can be maintained at a constant level.

When the control circuit 50 selects another voltage value as the reference voltage and inputs the reference voltage to the reference voltage input electrode 203, the output from the comparison determination circuit 26 and the voltage level Vin of the drive signal also change. The voltage level Vin of the drive signal can thus be changed in accordance with the type of the reference voltage.

The angular velocity sensor 1 and the circuit for an angular velocity sensor 2 according to the present embodiment can provide the following advantageous effects.

That is, since the switch circuit 40 can switch the state in which the detector 12 is electrically continuous with the drive circuit 20 to the state in which the detector 12 is not electrically continuous with the drive circuit 20 and vice versa, the signal from the drive circuit 20 can be applied to the detector 12. The detector 12 can therefore also be tested.

In particular, in a structure in which the detector 12 is substantially stationary even when the driver 11 vibrates, such as the structure of the angular velocity detection device 10, it is difficult to test the state of vibration of the detector 12, in contrast to a physical quantity detection device in which the detector 12 moves integrally with the driver 11. The circuit for an angular velocity sensor 2 according to the present embodiment, however, allows the detector 12 to vibrate in the same manner as the driver 11, whereby a precise test can be conducted.

Further, since in the state in which the detector 12 is electrically continuous with the drive circuit 20, the driver 11 is not allowed to electrically continuous with the drive circuit 20, whereas in the state in which the detector 12 is not electrically continuous with the drive circuit 20, the driver 11 is allowed to electrically continuous with the drive circuit 20, the switch circuit 40 can switch the state in which the signal from the drive circuit 20 is applied to the driver 11 to the state in which the signal from the drive circuit 20 is applied to the detector 12 and vice versa. Therefore, in the angular velocity sensor 1 provided by the present embodiment, the circuit for an angular velocity sensor 2 allows the single drive circuit 20 to test both the driver 11 and the detector 12.

Further, since the reference voltage inputted to the reference voltage input electrode 203 is selected from a plurality of voltage values, a configuration in which the drive voltage is controlled on the basis of the reference voltage and the reference voltage can be changed can be employed. Therefore, in normal operation, the excitation current can be so controlled as to be constant irrespective of a change in external temperature, whereas in other cases, the drive circuit 20 can output a test drive signal different from the drive signal in normal operation by changing the reference voltage. Therefore, in the angular velocity sensor 1 provided by the present embodiment, the circuit for an angular velocity sensor 2, which has a simple configuration, can detect a physical quantity and test the driver and the detector.

Step of Testing Physical Quantity Sensor

Figure 3:
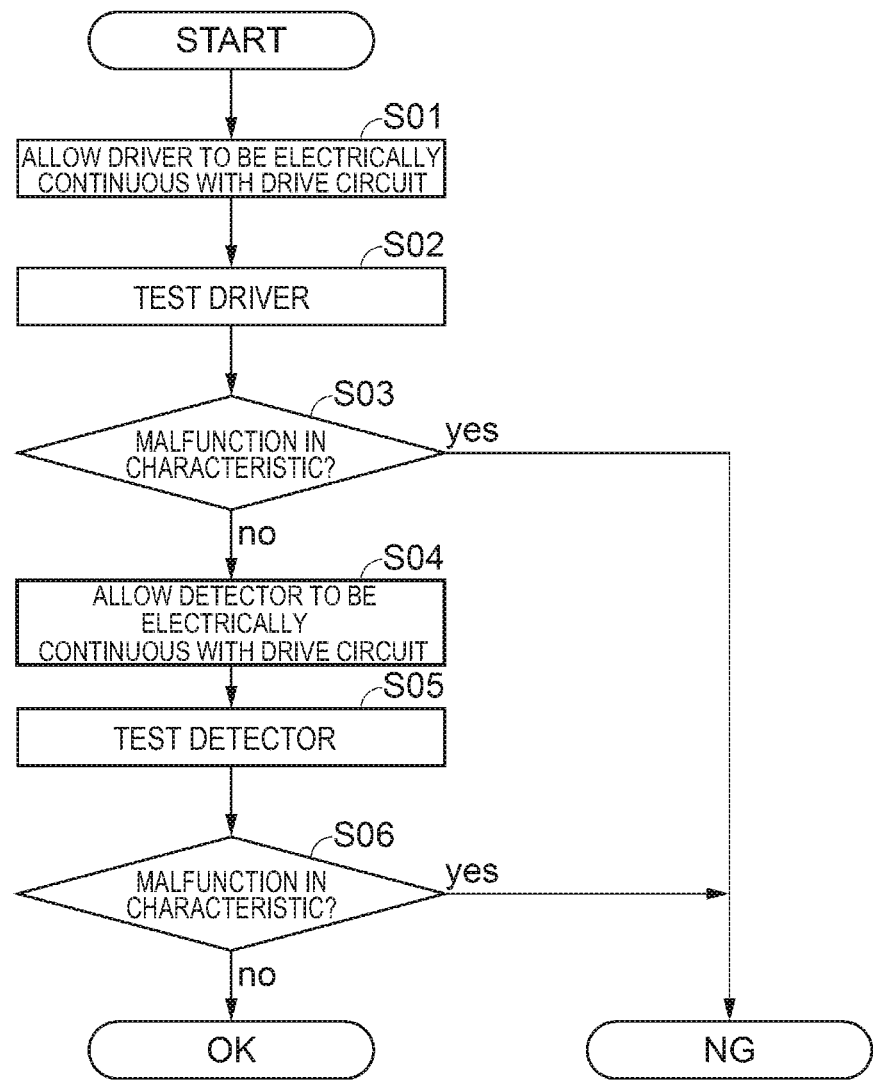
FIG. 3 is a step diagram of a test of a physical quantity sensor.

FIG. 3 is a step diagram showing the step of testing the angular velocity sensor 1 as the physical quantity sensor according to the present embodiment.

In step S01, the first switch circuit 41 to the fourth switch circuit 44 are so controlled as to achieve the state in which the driver 11 is electrically continuous with the drive circuit 20 but the detector 12 is not electrically continuous with the drive circuit 20.

In step S02, the driver 11 is tested by using the test drive signal from the drive circuit 20 to cause the driver 11 to vibrate.

The test drive signal is generated by changing the reference voltage inputted from the control circuit 50 to the reference voltage input electrode 203.

For example, a test drive signal having a voltage level higher than the voltage level of the drive signal in normal operation can be generated by inputting reference voltage higher than the reference voltage in normal operation in which a physical quantity is detected. The higher-voltage-level test drive signal allows what is called a burn-in test in which the driver 11 is caused to keep vibrating at a high excitation level for several hours and a change in any electrical characteristic before and after the test is examined for rejection of a defect product. The burn-in test may be conducted at a high temperature, and the high-temperature burn-in test allows identification of a defect product with higher precision.

Further, for example, input of a plurality of reference voltage values for generation of drive signals of a plurality of voltage levels allows what is called a DLD (drive level dependence) test in which a change in any electrical characteristic in accordance with a change in the voltage level of the drive signal is examined. The DLD test can be conducted more quickly than the burn-in test, whereby test cost can be lowered.

In step S03, it is determined on the basis of any of the tests described above whether or not the driver 11 malfunctions. When the driver 11 malfunctions (S03: yes), the driver 11 is determined to be defective, and the test is terminated. When the driver 11 functions normally (S03: no), the control proceeds to step S04.

In step S04, the first switch circuit 41 to the fourth switch circuit 44 are so controlled as to achieve the state in which the detector 12 is electrically continuous with the drive circuit 20 but the driver 11 is not electrically continuous with the drive circuit 20.

In step S05, the detector 12 is tested by using the test drive signal from the drive circuit 20 to cause the detector 12 to vibrate. The test of the detector 12 is conducted in the same manner as the test of the driver 11 in step S02.

In step S06, it is determined on the basis of any of the tests described above whether or not the detector 12 malfunctions. When the detector 12 malfunctions (S06: yes), the detector 12 is determined to be a defective product, and the test is terminated. When the detector 12 functions normally (S06: no), the detector 12 is determined to be a conforming product, and the test is terminated.

Details of Test of Driver

The test of the driver 11 will be described below in detail.

Figure 4:
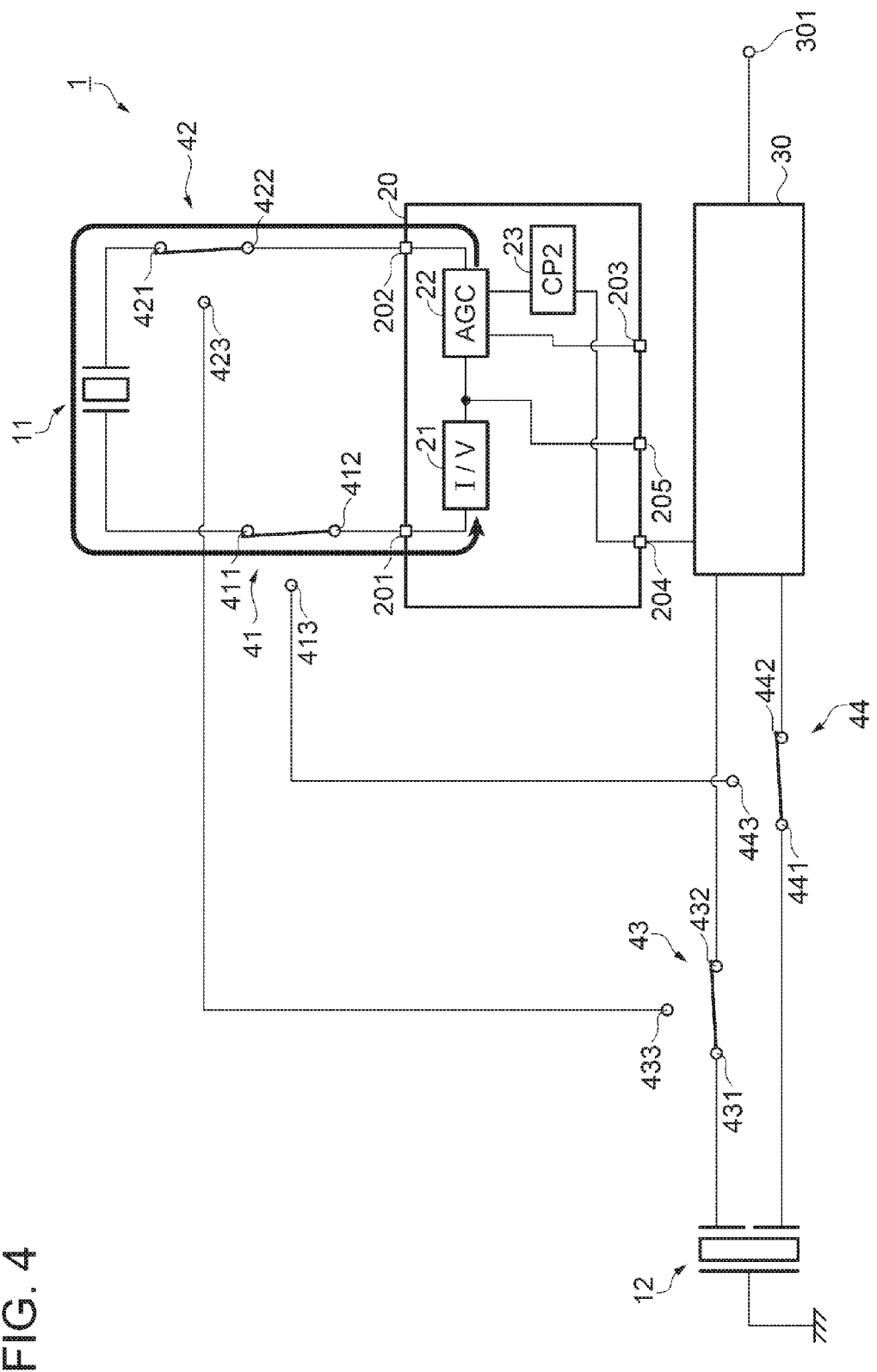
FIG. 4 is a schematic view of circuit operation in a test of a driver.

FIG. 4 is a schematic view representing operation of the circuit for an angular velocity sensor 2 in the test of the driver 11.

To test the driver 11, the first-first terminal 411 and the first-second terminal 412 of the first switch circuit 41 are caused to be electrically continuous with each other, the second-first terminal 421 and the second-second terminal 422 of the second switch circuit 42 are caused to be electrically continuous with each other, the third-first terminal 431 and the third-second terminal 432 of the third switch circuit 43 are caused to be electrically continuous with each other, and the fourth-first terminal 441 and the fourth-second terminal 442 of the fourth switch circuit 44 are caused to be electrically continuous with each other. The state in which the detector 12 is not electrically continuous with the drive circuit 20 but the driver 11 is electrically continuous with the drive circuit 20 is thus achieved. As a result, the driver 11 and the drive circuit 20 form an oscillation loop, as indicated by the thick arrow.

The test of the driver 11 is conducted, for example, by measurement of a CI (crystal impedance; equivalent series resistance) value. In the present embodiment, the drive voltage outputted from the AGC circuit 22 is the voltage applied to the driver 11, and the voltage signal outputted from the current/voltage conversion circuit 21 corresponds to the excitation current flowing through the driver 11. A value corresponding to the CI value can therefore be obtained by measuring the voltage level of the output through the drive voltage output electrode 202 and the voltage level of the output through the IVO electrode 205, which is electrically connected to the output node of the current/voltage conversion circuit 21, and determining (voltage level of output through drive voltage output electrode 202)/(voltage level of output through IVO electrode 205). In the following description, the thus calculated value is described as the CI value for convenience.

Figure 5:
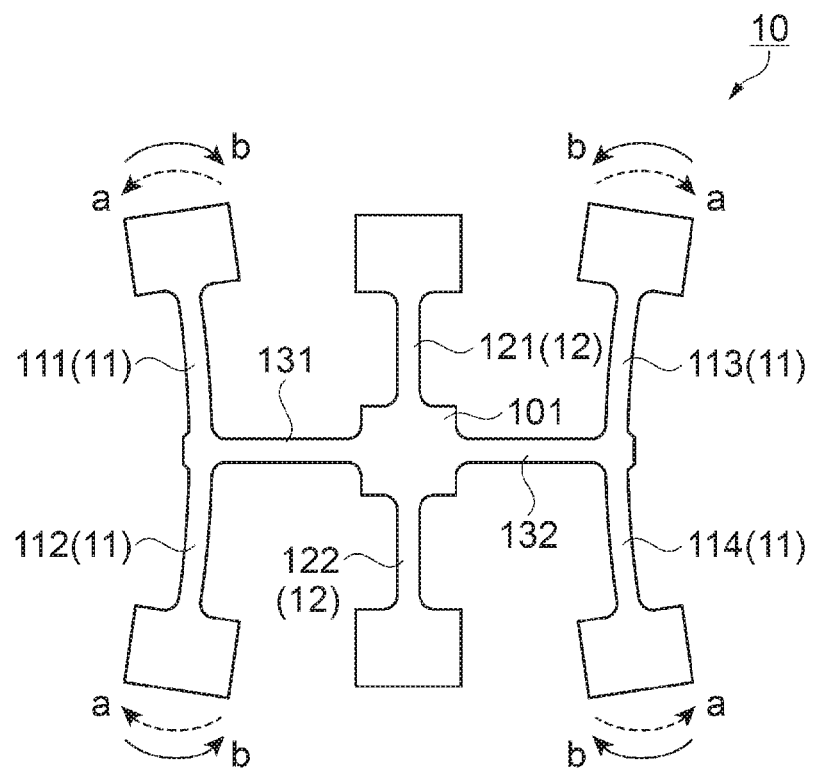
FIG. 5 is a schematic view of action of a physical quantity detection device in the test of the driver.

FIG. 5 is a schematic view representing action of the angular velocity detection device 10 in the test of the driver 11.

The angular velocity detection device 10 undergoes detection vibration in accordance with Coriolis force produced in response to rotation of the angular velocity detection device 10 and outputs an electric signal according to the detection vibration. In a preferable example, the angular velocity detection device 10 is what is called a double-T vibrator and is formed, for example, of a base 101, the driver 11, the detector 12, a first linkage arm 131, and a second linkage arm 132. The angular velocity detection device 10 is made of quartz ($SiO_2$ crystal).

The detector 12 includes a first detection arm 121 and a second detection arm 122. The first detection arm 121 and the second detection arm 122 extend from the base 101 in opposite directions.

The driver 11 includes a first drive arm 111, a second drive arm 112, a third drive arm 113, and a fourth drive arm 114. The first drive arm 111 and the second drive arm 112 extend from the first linkage arm 131 in opposite directions along the direction in which the first detection arm 121 and the second detection arm 122 extend. The third drive arm 113 and the fourth drive arm 114 extend from the second linkage arm 132 in opposite directions along the direction in which the first detection arm 121 and the second detection arm 122 extend.

The first linkage arm 131 and the second linkage arm 132 extend from the base 101 in opposite directions in a direction that intersects the direction in which the first detection arm 121 and the second detection arm 122 extend.

To test the driver 11, a driver test signal is applied to the first drive arm 111 to the fourth drive arm 114 via a drive electrode (not shown) with which the driver 11 is provided. The application of the driver test signal causes the first drive arm 111 and the third drive arm 113 to undergo flexural vibration in which they repeatedly separate from each other (direction "a" shown in FIG. 5) and approach each other (direction "b" shown in FIG. 5) and the second drive arm 112 and the fourth drive arm 114 to undergo flexural vibration in which they repeatedly separate from each other (direction "a" shown in FIG. 5) and approach each other (direction "b" shown in FIG. 5).

If the driver 11 has a defect, such as a crack, a foreign substance attached thereto, or any other abnormality, the flexural vibration shows behavior different from that of a conforming driver 11, whereby it can be determined by the test described above that the driver 11 malfunctions.

For example, when a burn-in test is conducted on a defective driver 11, the defect is enhanced, resulting in an increase in the CI value after the burn-in from the CI value before the burn-in. In a case of a driver 11 to which a foreign substance is attached, the state of the foreign substance changes due to the burn-in, and the CI value changes.

Therefore, a change in the CI value before and after the burn-in is examined, and when the change exceeds an acceptable range, it is determined that the driver malfunctions, whereas when the change falls within the acceptable range, it is determined that the driver functions normally.

Further, for example, when the DLD test is conducted on a defective driver 11, a driver 11 to which a foreign substance is attached, or any other abnormal driver 11, a change in the voltage level Vin of the drive signal results in a change in the state of the defect or the foreign substance, and the CI value therefore changes differently from that of a conforming product. Therefore, the behavior of the CI value in response to a change in the voltage level Vin is examined, and the change is compared with an ideal change. When the change does not fall within an acceptable range, it is determined that the driver 11 malfunctions, whereas when the change falls within the acceptable range, it is determined that the driver 11 functions normally.

Details of Test of Detector

The test of the detector 12 will next be described in detail.

Figure 6:
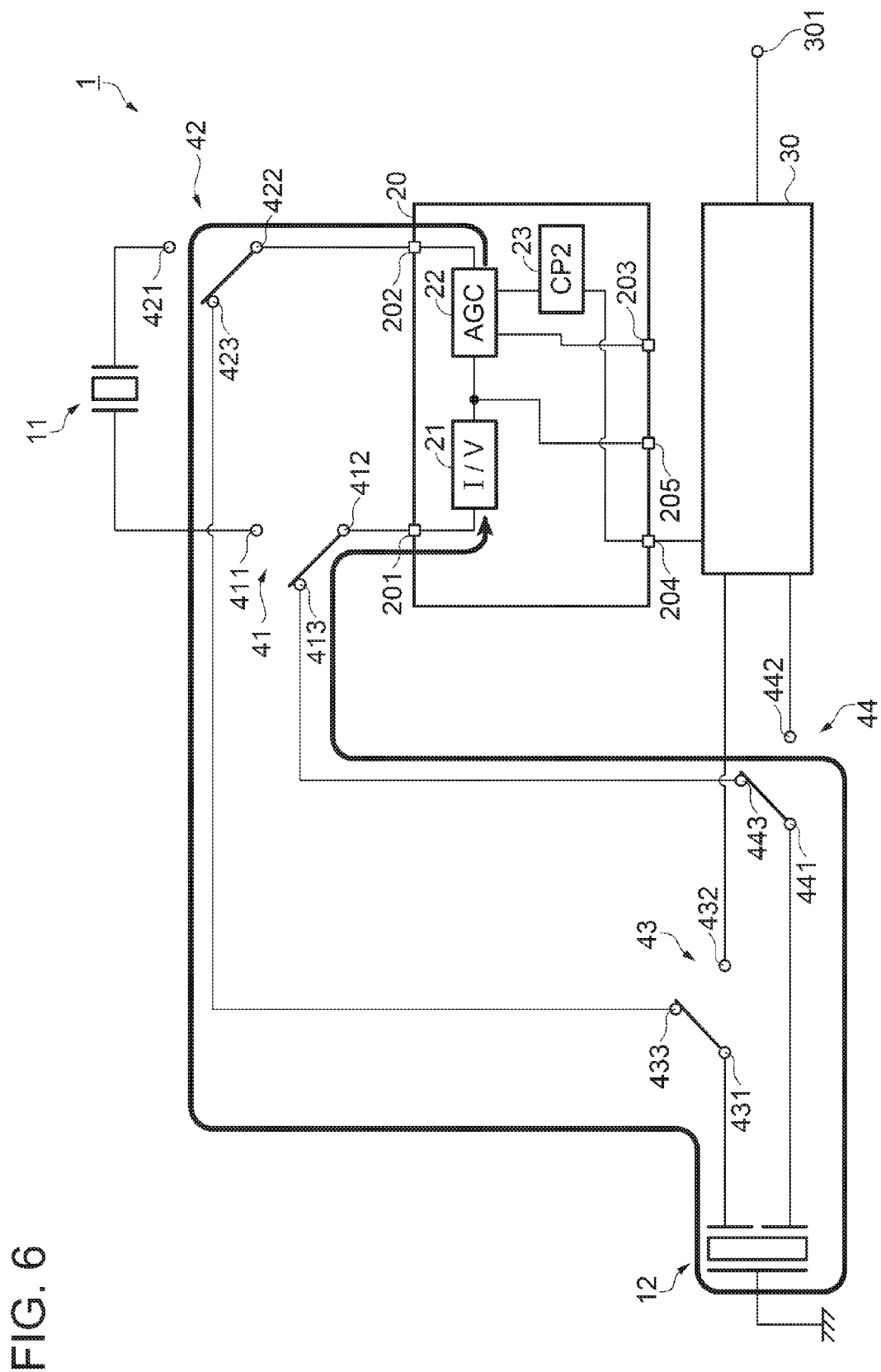
FIG. 6 is a schematic view of circuit operation in a test of a detector.

FIG. 6 is a schematic view representing operation of the circuit for an angular velocity sensor 2 in the test of the detector 12.

To test the detector 12, the first-second terminal 412 and the first-third terminal 413 of the first switch circuit 41 are caused to be electrically continuous with each other, the second-second terminal 422 and the second-third terminal 423 of the second switch circuit 42 are caused to be electrically continuous with each other, the third-first terminal 431 and the third-third terminal 433 of the third switch circuit 43 are caused to be electrically continuous with each other, and the fourth-first terminal 441 and the fourth-third terminal 443 of the fourth switch circuit 44 are caused to be electrically continuous with each other. The state in which the detector 12 is electrically continuous with the drive circuit 20 but the driver 11 is not electrically continuous with the drive circuit 20 is thus achieved. As a result, the detector 12 and the drive circuit 20 form an oscillation loop, as indicated by the thick arrow in FIG. 6.

The test of the detector 12 is the same as the test of the driver 11. For example, measurement of the CI value allows determination of whether the detector 12 malfunctions or functions normally.

Figure 7:
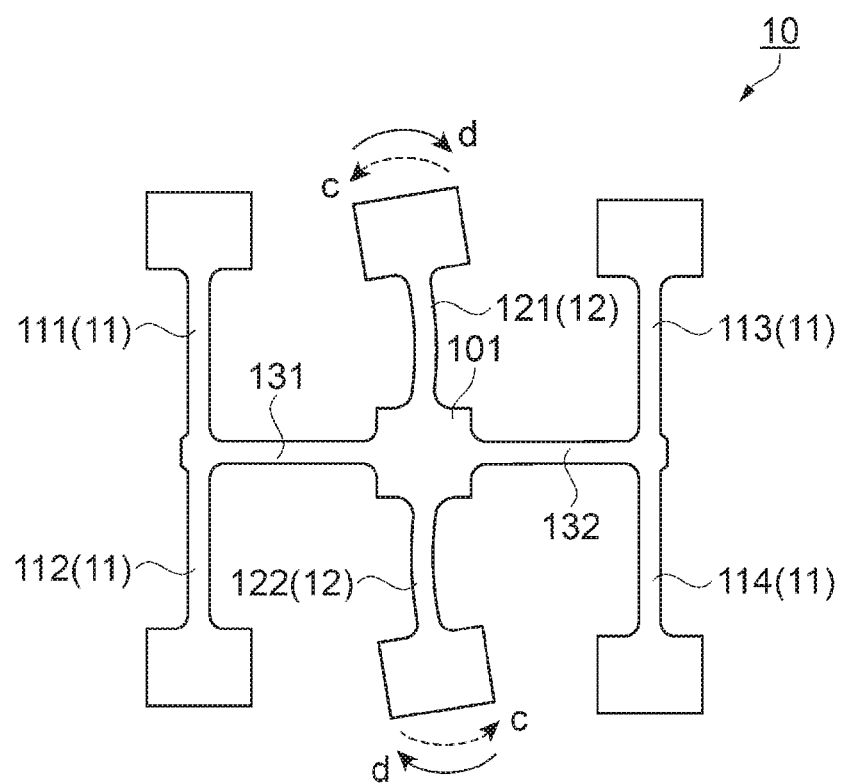
FIG. 7 is a schematic view of action of the physical quantity detection device in the test of the detector.

FIG. 7 is a schematic view representing action of the angular velocity detection device 10 in the test of the detector 12.

To test the detector 12, a detector test signal is applied to the first detection arm 121 and the second detection arm 122 via a detection electrode (not shown) with which the detector 12 is provided. The first detection arm 121 and the second detection arm 122 then vibrate in opposite directions, as indicated by the directions "c" and "d".

Also in the case of the detector 12, a conforming detector 12 vibrates differently from a defective detector 12, whereby the test described above allows detection of a defective product.

Figure 8:
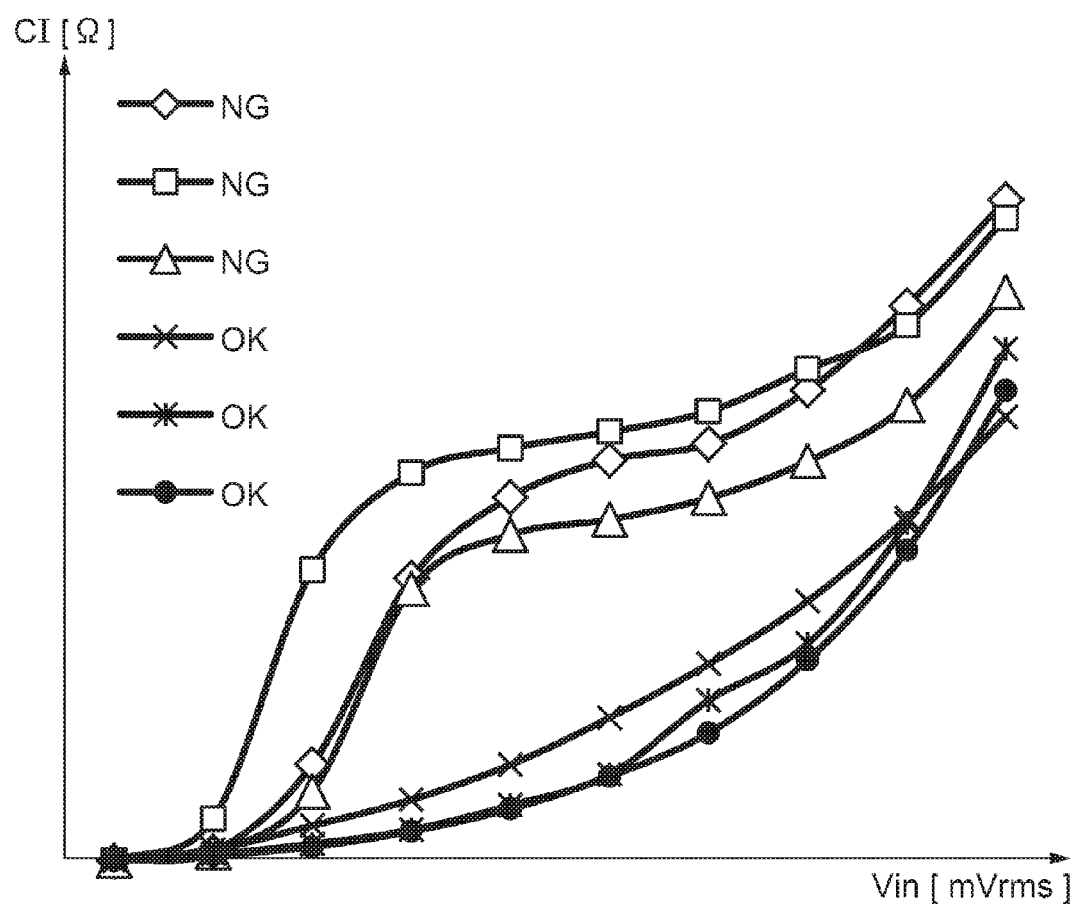
FIG. 8 shows characteristic data obtained from tests of the driver.

Determination of Whether or not Product Malfunctions or Functions Normally on the Basis of Resultant Data FIG. 8 represents data obtained in a DLD test of the driver 11. The horizontal axis represents the voltage level Vin of the drive signal, and the vertical axis represents the CI value of the driver 11.

The letters "OK" shown in the legend represent data on conforming products, and the letters "NG" shown in the legend represent data on defective products. In any of the conforming products, the CI value generally changes with the change in the voltage level Vin of the drive signal in such a way that the graph of the CI value has a downwardly convex shape. On the other hand, in any of the defective products, the CI value steeply increases as the voltage level Vin increases and then gently increases. That is, the graph of the CI value of each of the defective products has an upwardly convex portion and a downwardly convex portion.

Therefore, after the DLD test is conducted, good/no good determination can be made on the basis of a graph of resultant data. For example, a curve representing an ideal change in the CI value may be set, and when the discrepancy from the curve falls within an acceptable level, it may be determined that the product under test functions normally, whereas when the discrepancy from the curve does not fall within the acceptable level, it may be determined that the product under test malfunctions.

The data obtained from tests of the driver 11 have been described above, and the same holds true for the detector 12.

According to the test method described above, the following advantageous effect can be provided.

That is, since the switch circuit 40 can apply the signal from the drive circuit 20 to the detector 12 for the test thereof, the detector 12 can also be tested in the simple configuration without use of any special external apparatus. In particular, since the state in which the signal from the drive circuit 20 is applied to the detector 12 is switched to the state in which the signal from the drive circuit 20 is applied to the driver 11 and vice versa, the detector 12 and the driver 11 can be tested in the simple configuration.

Steps of Manufacturing Physical Quantity Sensor

Figure 9:
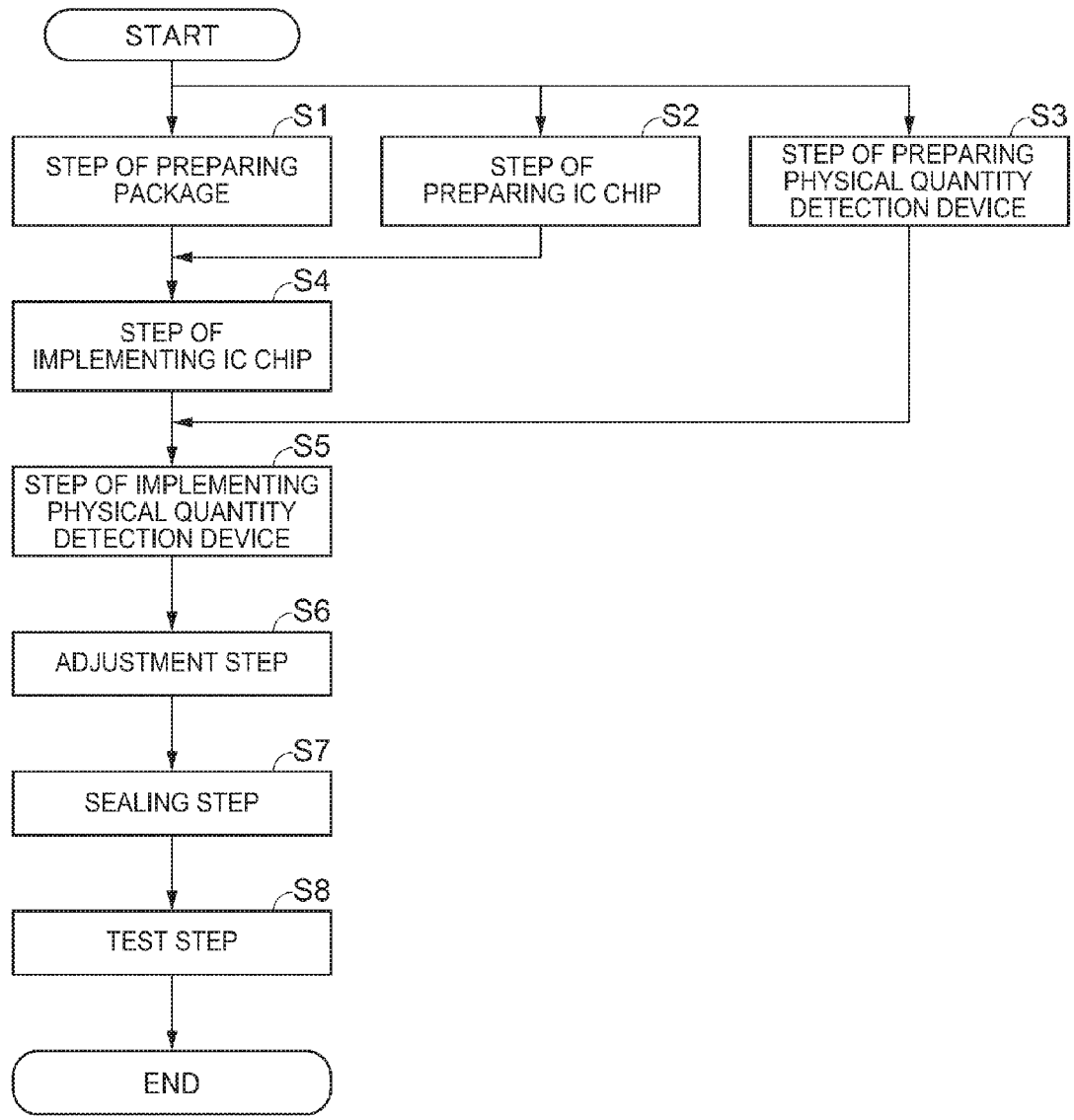
FIG. 9 shows the steps of manufacturing the physical quantity sensor.

FIG. 9 is a step diagram representing the steps of manufacturing the angular velocity sensor 1 as the physical quantity sensor according to the present embodiment.

Step S1 is the step of preparing a package for accommodating the angular velocity detection device 10 as the physical quantity detection device and an IC chip. The package has a roughly box-like shape and formed, for example, of a main body section and a lid section made of a ceramic material. The main body section has a recess for accommodating the angular velocity detection device 10 and the IC chip, and the lid section has a brazing material or any other material for sealing the main body section.

Step S2 is the step of preparing the IC chip. The IC chip is formed of a semiconductor substrate, such as a silicon substrate, and includes the circuit for an angular velocity sensor 2 as the circuit for a physical quantity sensor.

Step S3 is the step of preparing the angular velocity detection device 10 as the physical quantity detection device. The outer shape and electrodes of the angular velocity detection device 10 are formed by photolithography and etching performed on a quartz substrate.

Step S4 is the step of implementing the IC chip. The IC chip is placed on the main body section of the package and, in a preferable example, electrically connected to electrodes provided on the main body section by wire bonding.

Step S5 is the step of implementing the angular velocity detection device 10. The angular velocity detection device 10 is placed on a tab tape disposed above the IC chip, supported by the tab tape, and electrically connected to the IC chip.

Step S6 is an adjustment step in which the angular velocity detection device 10 is irradiated with laser light for adjustment of the weight of a vibration section for adjustment of resonance frequency and leakage signal output.

Step S7 is a sealing step in which the main body section of the package is sealed with the lid section.

Step S8 is a test step in which it is determined by using the test method described above whether the driver 11 and the detector 12 malfunction or function normally and a product having been determined to be defective is rejected.

According to the manufacturing method described above, the following advantageous effect can be provided.

That is, since the signal from the drive circuit 20 can be applied to the detector 12 for the test thereof, the detector 12 can also be tested in the simple configuration without use of any special external apparatus. The angular velocity sensor 1 can therefore be manufactured in the simple configuration.

Second Embodiment

Figure 10:
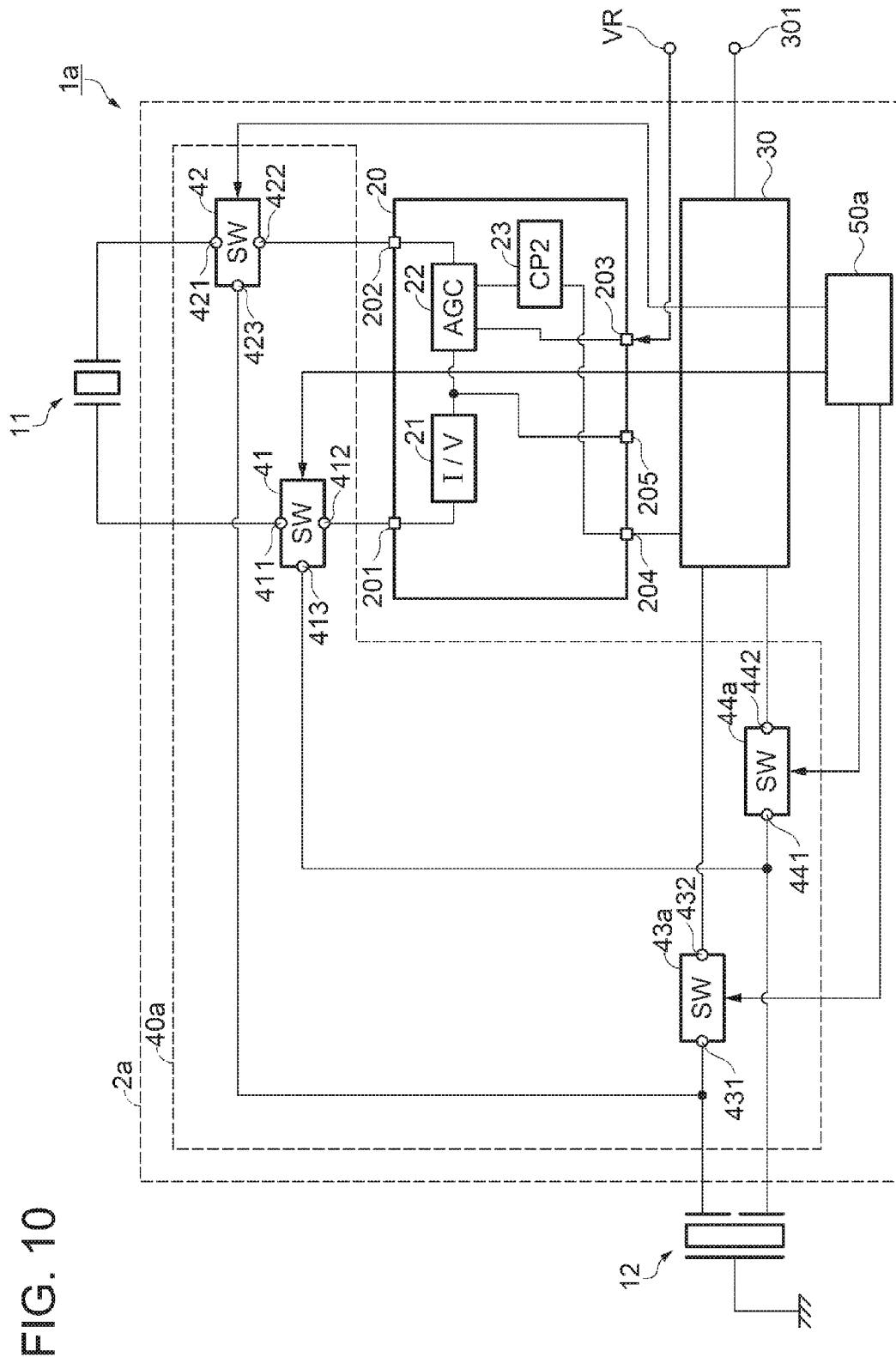
FIG. 10 is a schematic view of a physical quantity sensor according to a second embodiment.

FIG. 10 is a schematic view of an angular velocity sensor 1a as the physical quantity sensor according to a second embodiment.

The physical quantity sensor according to the present embodiment will be described with reference to FIG. 10. The same constituent portions as those in the first embodiment have the same reference numerals, and no duplicate description will be made.

The angular velocity sensor 1a is formed, for example, of the angular velocity detection device 10 and a circuit for an angular velocity sensor 2a as the circuit for a physical quantity sensor. The circuit for an angular velocity sensor 2a is formed, for example, of the drive circuit 20, the detection circuit 30, a switch circuit 40a, and a control circuit 50a.

The switch circuit 40a is formed, for example, of the first switch circuit 41, the second switch circuit 42, a third switch circuit 43a, and a fourth switch circuit 44a.

The third switch circuit 43a has the third-first terminal 431 and the third-second terminal 432. The fourth switch circuit 44a has the fourth-first terminal 441 and the fourth-second terminal 442. The configurations of the first switch circuit 41 and the second switch circuit 42 are the same as those in the first embodiment.

The first-third terminal 413 of the first switch circuit 41 is electrically connected to the fourth-first terminal 441 of the fourth switch circuit 44a and the other end of the detector 12. The second-third terminal 423 of the second switch circuit 42 is electrically connected to the third-first terminal 431 of the third switch circuit 43a and the one end of the detector 12. The third-first terminal 431 of the third switch circuit 43a is electrically connected to the second-third terminal 423 of the second switch circuit 42 and the one end of the detector 12. The fourth-first terminal 441 of the fourth switch circuit 44a is electrically connected to the first-third terminal 413 of the first switch circuit 41 and the other end of the detector 12. The other terminals are connected in the same manner as in the first embodiment.

The third switch circuit 43a is so provided as to switch the state thereof between a state in which the third-first terminal 431 is electrically continuous with the third-second terminal 432 and a state in which the third-first terminal 431 is not electrically continuous with the third-second terminal 432, and the fourth switch circuit 44a is so provided as to switch the state thereof between a state in which the fourth-first terminal 441 is electrically continuous with the fourth-second terminal 442 and a state in which the fourth-first terminal 441 is not electrically continuous with the fourth-second terminal 442.

The control circuit 50a inputs controls signals to the first switch circuit 41 to the fourth switch circuit 44a and controls the connection switching in each of the switch circuits.

The angular velocity sensor 1a has an external terminal VR electrically connected to the reference voltage input electrode 203 and is therefore configured to be capable of receiving the reference voltage as an input from an external apparatus. The angular velocity sensor 1*a* can therefore freely change the voltage level Vin of the drive signal as required.

Figure 11:
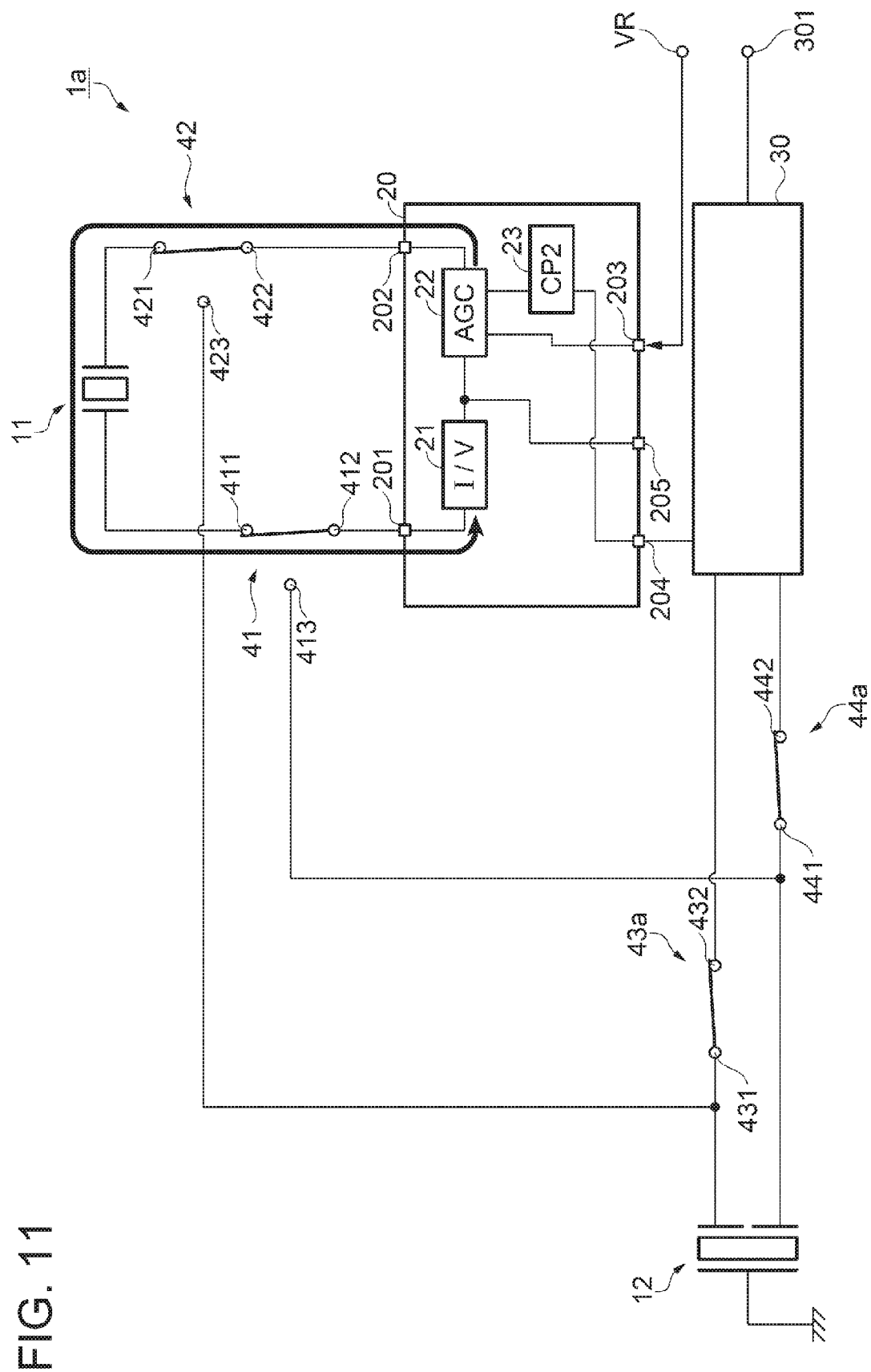
FIG. 11 is a schematic view of circuit operation in a test of a driver of the physical quantity sensor according to the second embodiment.

FIG. 11 is a schematic view showing circuit operation in the angular velocity sensor 1*a* in the test of the driver 11.

To test the driver 11, the first-first terminal 411 and the first-second terminal 412 of the first switch circuit 41 are caused to be electrically continuous with each other, and the second-first terminal 421 and the second-second terminal 422 of the second switch circuit 42 are caused to be electrically continuous with each other. The state in which the detector 12 is not electrically continuous with the drive circuit 20 but the driver 11 is electrically continuous with the drive circuit 20 is thus achieved. As a result, the driver 11 and the drive circuit 20 form an oscillation loop, as indicated by the thick arrow in FIG. 11, whereby the driver 11 can be tested.

In this state, the third switch circuit 43*a* and the fourth switch circuit 44*a* may have an arbitrary state, the ON or OFF state.

Figure 12:
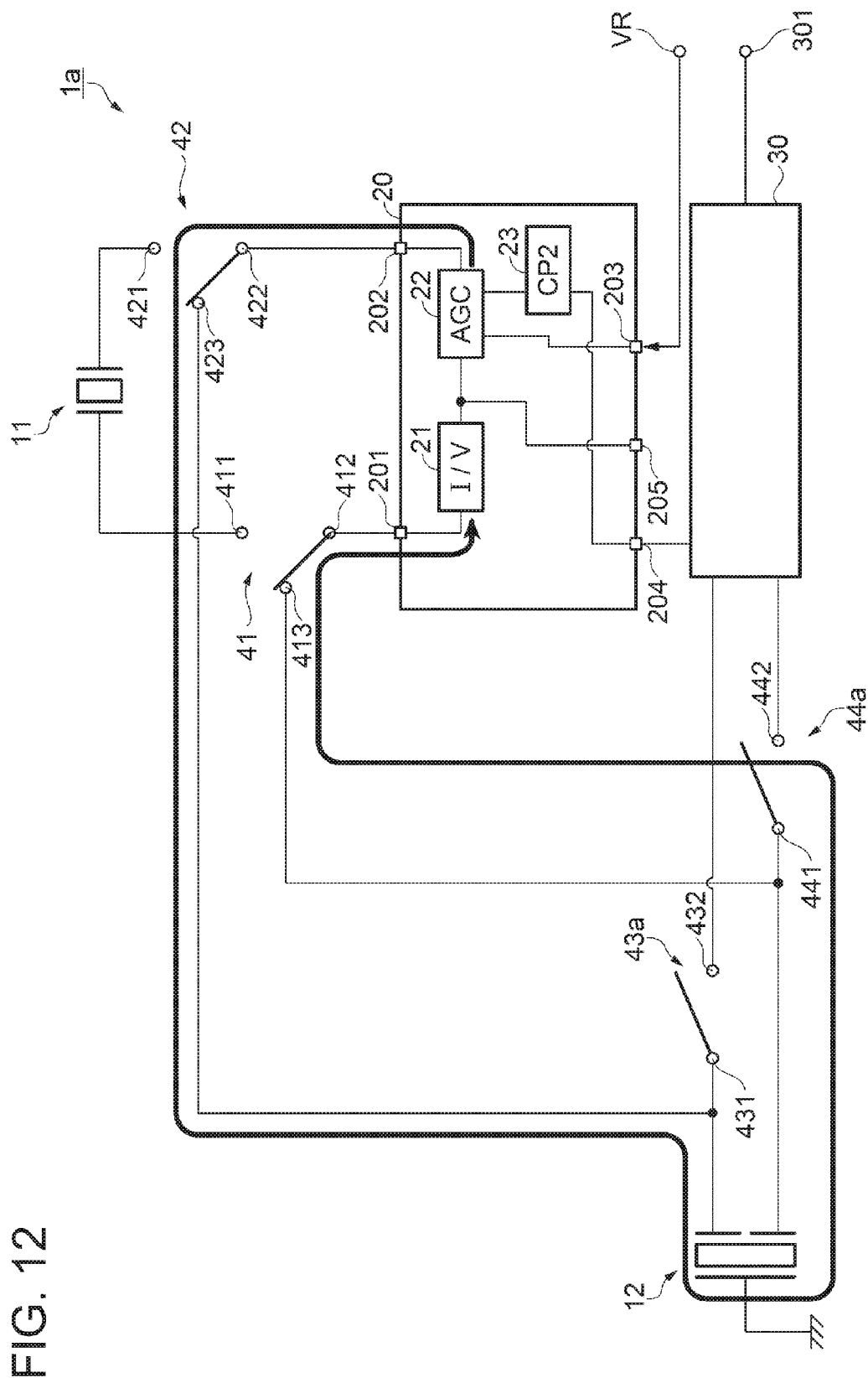
FIG. 12 is a schematic view of circuit operation in a test of a detector of the physical quantity sensor according to the second embodiment.

FIG. 12 is a schematic view showing circuit operation in the angular velocity sensor 1*a* in the test of the detector 12.

To test the detector 12, the first-second terminal 412 and the first-third terminal 413 of the first switch circuit 41 are caused to be electrically continuous with each other, and the second-second terminal 422 and the second-third terminal 423 of the second switch circuit 42 are caused to be electrically continuous with each other. The third switch circuit 43*a* and the fourth switch circuit 44*a* are both turned off. The state in which the detector 12 is electrically continuous with the drive circuit 20 but the driver 11 is not electrically continuous with the drive circuit 20 is thus achieved. Further, the state in which the detector 12 is not electrically continuous with the detection circuit 30 is achieved. As a result, the detector 12 and the drive circuit 20 form an oscillation loop, as indicated by the thick arrow in FIG. 12, whereby the detector 12 can be tested.

As described above, the physical quantity sensor according to the present embodiment can provide the following advantageous effects as well as the advantageous effects provided by the first embodiment.

That is, since each of the third switch circuit 43*a* and the fourth switch circuit 44*a* has only two terminals, the state in which the signal from the drive circuit 20 is applied to the driver 11 can be switched to the state in which the signal from the drive circuit 20 is applied to the detector 12 and vice versa in the simpler configuration. Further, since the external terminal VR, to which the reference voltage is inputted, is provided, the voltage level of the drive signal can be freely changed in accordance with the type of the test and the type of the angular velocity detection device 10.

The angular velocity sensor 1*a* as the physical quantity sensor according to the second embodiment can also be tested and manufactured by using the same steps as those by which the angular velocity sensor 1 according to the first embodiment is tested and manufactured, and the same advantageous effects can be provided.

The invention is not limited to the embodiments describe above, and a variety of changes, improvements, and other modifications can be made to the embodiments described above. Variations will be described below.

Variation 1

In the first embodiment, each of the first switch circuit 41 and the second switch circuit 42 has three terminals, but each of the first switch circuit 41 and the second switch circuit 42 may instead have two terminals. In this case, the state in which the signal from the drive circuit 20 is applied to the detector 12 can be switched to the state in which the signal from the drive circuit 20 is applied to the driver 11 and vice versa, for example, by employing the following configuration.

That is, a configuration in which one end of the first switch circuit 41 is electrically connected to one end of the driver 11 and the other end of the first switch circuit 41 is electrically connected to the excitation current input electrode 201 of the drive circuit 20 is employed.

Further, a configuration in which one end of the second switch circuit 42 is electrically connected to the other end of the driver 11 and the other end of the second switch circuit 42 is electrically connected to the drive voltage output electrode 202 of the drive circuit 20 is employed.

Moreover, a configuration in which the third-first terminal 431 of the third switch circuit 43 is electrically connected to one end of the detector 12, the third-second terminal 432 of the third switch circuit 43 is electrically connected to one end of the input section of the detection circuit 30, and the third-third terminal 433 of the third switch circuit 43 is electrically connected to the other end of the second switch circuit 42 and the drive voltage output electrode 202 of the drive circuit 20 is employed.

Further, a configuration in which the fourth-first terminal 441 of the fourth switch circuit 44 is electrically connected to the other end of the detector 12, the fourth-second terminal 442 of the fourth switch circuit 44 is electrically connected to the other end of the input section of the detection circuit 30, and the fourth-third terminal 443 of the fourth switch circuit 44 is electrically connected to the other end of the first switch circuit 41 and the excitation current input electrode 201 of the drive circuit 20 is employed.

In the configuration described above, the switch circuit 40 controls the first to fourth switch circuits as follows.

To test the driver 11, the first switch circuit 41 and the second switch circuit 42 are both turned on, the third-first terminal 431 and the third-second terminal 432 of the third switch circuit 43 are caused to be electrically continuous with each other, and the fourth-first terminal 441 and the fourth-second terminal 442 of the fourth switch circuit 44 are caused to be electrically continuous with each other. The state in which the driver 11 is electrically continuous with the drive circuit 20 but the detector 12 is not electrically continuous with the drive circuit 20 is thus achieved.

To test the detector 12, the first switch circuit 41 and the second switch circuit 42 are both turned off, the third-first terminal 431 and the third-third terminal 433 of the third switch circuit 43 are caused to be electrically continuous with each other, and the fourth-first terminal 441 and the fourth-third terminal 443 of the fourth switch circuit 44 are caused to be electrically continuous with each other. The state in which the detector 12 is electrically continuous with the drive circuit 20 but the driver 11 is not electrically continuous with the drive circuit 20 is thus achieved.

Variation 2

The first and second embodiments have been described with reference to the configuration in which the switch circuit 40 (40*a*) switches the state in which the detector 12 is electrically continuous with the drive circuit 20 but the driver 11 is not electrically continuous with the drive circuit 20 to the state in which the detector 12 is not electrically continuous with the drive circuit 20 but the driver 11 is electrically continuous with the drive circuit 20 and vice versa, but the circuit for a physical quantity sensor and the physical quantity sensor according to an embodiment of the invention are not necessarily configured this way.

For example, a configuration in which the drive circuit 20 includes two oscillation circuits and the driver 11 is always electrically continuous with one of the oscillation circuits may be employed. In this case, employing a configuration in which the switch circuit 40 (40*a*) switches a state in which the detector 12 is electrically continuous with the other oscillation circuit to a state in which the detector 12 is not electrically continuous with the other oscillation circuit and vice versa allows the detector 12 to be tested by using the signal from the drive circuit 20.

According to the configuration described above, no switch circuit needs to be provided between the driver 11 and the drive circuit 20, whereby the number of switch circuits can be reduced.

Variation 3

The first and second embodiments have been described with reference to the configuration in which the switch circuit 40 (40*a*) switches the state in which the detector 12 is electrically continuous with the drive circuit 20 to the state in which the detector 12 is not electrically continuous with the drive circuit 20, but the method for testing the physical quantity sensor and the method for manufacturing the same according to an embodiment of the invention are not necessarily configured this way. For example, a wiring line that allows the detector 12 and the drive circuit 20 to be electrically continuous with each other may be provided, and after the detector 12 is tested, the wiring line may be cut, for example, by laser irradiation for switching the state in which the detector 12 is electrically continuous with the drive circuit 20 to the state in which the detector 12 is not electrically continuous with the drive circuit 20.

In the physical quantity sensor according to any of the embodiments of the invention, a variety of changes can be made to the embodiments and variations described above to the extent that the changes do not depart from the novel features and advantageous effects of the invention.

For example, the physical quantity sensor according to any of the embodiments of the invention does not necessarily have what is called a double-T shape and may be what is called an H-shaped sensor including two drive arms extending in parallel to each other from a base and two detection arms extending in parallel to each other from the base in the direction opposite the direction in which the drive arms extend.

The physical quantity sensor according to any of the embodiments of the invention may instead be a tuning-fork-type sensor including two vibration arms extending in parallel to each other from a base. In the case of the tuning-fork-type sensor, a state in which a detection electrode that outputs a detection signal is electrically continuous with the drive circuit 20 can be switched to a state in which a drive electrode to which a drive signal is applied in normal operation is electrically continuous with the drive circuit 20 and vice versa for a test of the state of vibration of the vibration arms in each of the direction of drive vibration and the direction of detection vibration.

The physical quantity sensor according to any of the embodiments of the invention may instead be an interdigital sensor formed in a MEMS process.

The physical quantity sensor according to any of the embodiments of the invention is not necessarily made of quartz and may instead be made, for example, of silicon or a piezoelectric ceramic material.

The physical quantity sensor according to any of the embodiments of the invention is not limited to an angular velocity sensor and only need to be a vibration-type sensor including the driver 11 and the detector 12.

The physical quantity sensor according to any of the embodiments of the invention can be incorporated, for example, into a smartphone, a digital camera, an inertia measurement unit, a mobile phone, a game console, a car navigation system, an automatic drive control apparatus for a moving object, a pointing device, a head mounted display, a tablet PC, and other electronic apparatus.

These electronic apparatuses described above into which the physical quantity sensor according to any of the embodiments of the invention is incorporated allow further reduction in possibility of being defective.

The physical quantity sensor according to any of the embodiments of the invention can also be incorporated, for example, in an automobile, an airplane, a ship, or any other moving object.

These moving objects into which the physical quantity sensor according to any of the embodiments of the invention is incorporated allow further reduction in possibility of being defective.

The entire disclosure of Japanese Patent Application No. 2015-089076, filed Apr. 24, 2015 is expressly incorporated by reference herein.

What is claimed is:

1. A circuit for a physical quantity sensor comprising:
   a first terminal and a second terminal, the first and second terminals being configured to be electrically continuous with a driver of a physical quantity sensing vibrator;
   a third terminal and a fourth terminal, the third and fourth terminals being configured to be electrically continuous with a detector of the physical quantity sensing vibrator, the detector being configured to output a detection signal in accordance with a physical quantity;
   a drive circuit that is configured to output a drive signal; and
   a switch circuit that is configured to switch between:
      a first state in which: (i) the third terminal and the fourth terminal are electrically connected to the drive circuit, and (ii) the first terminal and the second terminal are electrically disconnected from the drive circuit, and
      a second state in which (iii) the first terminal and the second terminal are electrically connected to the drive circuit, and (iv) the third terminal and the fourth terminal are disconnected from the drive circuit,
   wherein in the first state the detector is electrically connected to the drive circuit and the driver is electrically disconnected from the drive circuit and in the second state the driver is electrically connected to the drive circuit and the detector is electrically disconnected from the drive circuit.

2. The circuit for a physical quantity sensor according to claim 1, wherein
   the drive circuit includes
      a current/voltage conversion circuit that converts an inputted current signal into a voltage signal,
      a comparison determination circuit that outputs a signal based on comparison between the voltage signal and a reference voltage, and
      a drive signal generation circuit that outputs a signal having a voltage level based on the output from the comparison determination circuit, and
   the reference voltage is selected from a plurality of voltage values.

3. A physical quantity sensor comprising:
   a physical quantity sensing vibrator including a driver that is driven in accordance with a drive signal;

a detector that outputs a detection signal in accordance with a physical quantity;
a drive circuit that is configured to output the drive signal; and
a switch circuit that is configured to switch between:
   a first state in which: (i) the third terminal and the fourth terminal are electrically connected to the drive circuit, and (ii) the first terminal and the second terminal are electrically disconnected from the drive circuit, and
   a second state in which (iii) the first terminal and the second terminal are electrically connected to the drive circuit, and (iv) the third terminal and the fourth terminal are electrically disconnected from the drive circuit,
   wherein in the first state the detector is electrically connected to the drive circuit and the driver is electrically disconnected from the drive circuit and in the second state the driver is electrically connected to the drive circuit and the detector is electrically disconnected from the drive circuit.

4. The physical quantity sensor according to claim 3, wherein
the drive circuit includes
   a current/voltage conversion circuit that converts an inputted current signal into a voltage signal,
   a comparison determination circuit that outputs a signal based on comparison between the voltage signal and a reference voltage, and
   a drive signal generation circuit that outputs a signal having a voltage level based on the output from the comparison determination circuit, and
the reference voltage is selected from a plurality of voltage values.

5. A method for testing a physical quantity sensing vibrator including a driver that is driven in accordance with a drive signal and a detector that outputs a detection signal in accordance with a physical quantity, the method comprising:
   generating a test drive signal by using a drive circuit; and
   switching to a state in which the driver is electrically connected to the driver circuit and the detector is electrically disconnected to the drive circuit;
   testing the driver;
   switching to a state in which the detector is electrically connected to the driver circuit and the driver is electrically disconnected to the drive circuit; and
   testing the detector.

6. The method according to claim 5, wherein
the drive circuit includes
   a current/voltage conversion circuit that converts an inputted current signal into a voltage signal,
   a comparison determination circuit that outputs a signal based on comparison between the voltage signal and a reference voltage, and
   a drive signal generation circuit that outputs the test drive signal having a voltage level based on the output from the comparison determination circuit,
the reference voltage is selected from a plurality of voltage values, and
the voltage level of the test drive signal is higher than a voltage level of a signal generated by the drive circuit when the physical quantity is detected.

7. The method according to claim 5, wherein
the drive circuit includes
   a current/voltage conversion circuit that converts an inputted current signal into a voltage signal,
   a comparison determination circuit that outputs a signal based on comparison between the voltage signal and a reference voltage, and
   a drive signal generation circuit that outputs the test drive signal having a voltage level based on the output from the comparison determination circuit,
the reference voltage is selected from a plurality of voltage values, and
at least one of the testing the detector and the testing the driver is performed with a plurality of reference voltages according to the plurality of voltage values.

8. The method according to claim 5, wherein
the drive circuit includes
   a current/voltage conversion circuit that converts an inputted current signal into a voltage signal,
   a comparison determination circuit that outputs a signal based on comparison between the voltage signal and a reference voltage, and
   a drive signal generation circuit that outputs the test drive signal having a voltage level based on the output from the comparison determination circuit,
the reference voltage is selected from a plurality of voltage values, and
at least one of the testing the detector and the testing the driver is performed by measuring the voltage level of the output from the current/voltage conversion circuit and the voltage level of the output from the drive signal generation circuit.

9. The method according to claim 8, wherein the at least one of the testing the detector and the testing the driver is performed with a plurality of reference voltages according to the plurality of voltage values.

10. The method for manufacturing a physical quantity sensor according to claim 5, wherein
the drive circuit includes
   a current/voltage conversion circuit that converts an inputted current signal into a voltage signal,
   a comparison determination circuit that outputs a signal based on comparison between the voltage signal and a reference voltage, and
   a drive signal generation circuit that outputs the test drive signal having a voltage level based on the output from the comparison determination circuit, and
the reference voltage is inputted from an external terminal.

* * * * *